3,313,806
SULFANILYLAMINOPYRIDAZINONE DERIVATIVES AND METHOD FOR THEIR PRODUCTION

Takenari Nakagome, Nishinomiya, and Toshiaki Komatsu, Toyonaka, Japan, assignors to Sumitomo Chemical Co., Ltd., Osaka, Japan
No Drawing. Filed June 29, 1964, Ser. No. 379,014
Claims priority, application Japan, July 1, 1963, 38/34,746; July 3, 1963, 38/34,975
4 Claims. (Cl. 260—239.7)

The present invention relates to novel sulfanilylaminopyridazinone derivatives, their intermediates and a process for producing the same. More particularly it relates to 4-sulfanilylamino-3(2H)pyridazinone derivatives, their intermediates and a process for producing the same.

It is one object of the present invention to provide novel sulfanilylaminopyridazinone derivatives which are extremely valuable as chemotherapeutic agent due to their anti-bacterial activity.

It is also an object of this invention to provide intermediates for the above compounds.

Another object of the present invention is to provide a novel process for producing the sulfanilylaminopyridazinone derivatives and their intermediates.

The novel sulfanilylaminopyridazinone derivatives of the present invention are represented by the general Formula I,

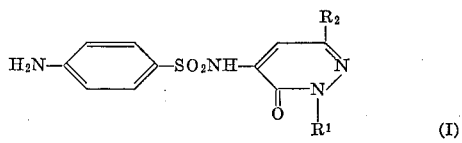

(I)

wherein $R^1$ represents a member selected from the group consisting of hydrogen atom and lower alkyl radicals and $R^2$ represents a member selected from the group consisting of halogen atoms and lower alkoxy radicals.

These compounds can be obtained, according to the present invention, by the reaction of a 4-amino-3(2H)pyridazinone derivative of the general Formula II,

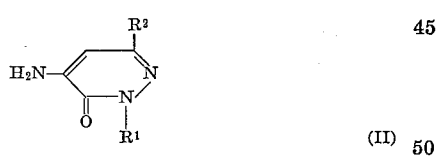

(II)

wherein $R^1$ represents a member selected from the group consisting of hydrogen atom and lower alkyl radicals and $R^2$ represents a member selected from the group consisting of halogen atoms and lower alkoxy radicals, with a p-acylaminobenzenesulfonyl halide to form a 4-(p-acylaminobenzenesulfonylamino)-3(2H)pyridazinone derivative of the general Formula III,

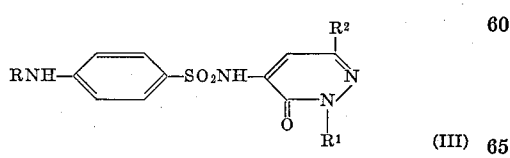

(III)

wherein R represents an acyl radical, $R^1$ represents a member selected from the group consisting of hydrogen atom and lower alkyl radicals and $R^2$ represents a member selected from the group consisting of halogen atom and lower alkoxy radicals, followed by hydrolysis.

4-amino-3(2H)pyridazinone derivatives of the above indicated general Formula II, which are used for the production of the compounds of the present invention, can readily be produced by the following processes.

The 4-amino-3(2H)pyridazinone derivative of the general Formula IV,

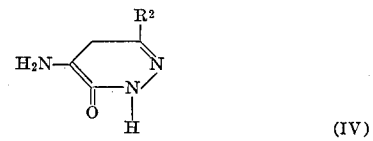

(IV)

wherein $R^2$ represents a member selected from the group consisting of halogen atoms and lower alkoxy radicals can readily be produced by heating a 4-amino-3,6-disubstituted-pyridazine derivative of the general Formula V,

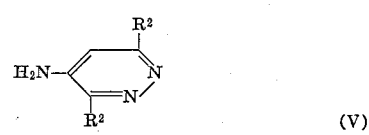

(V)

wherein $R^2$ represents a member selected from the group consisting of halogen atoms and lower alkoxy radicals, in the presence of an alkali hydroxide or an alkoxide. This is the novel process for producing the compounds of the general Formula IV, and the compounds having the lower alkoxy radicals as the $R^2$ in the general Formula IV are novel compounds.

The novel 4-amino-3(2H)pyridazinone derivative of the general Formula VI,

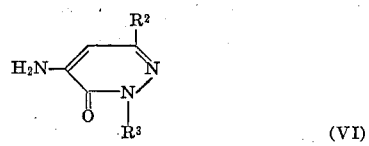

(VI)

wherein $R^2$ represents a member selected from the group consisting of halogen atoms and lower alkoxy radicals and $R^3$ represents a lower alkyl radical, can readily be produced by the action of an alkylating agent, such as dialkyl sulfates and alkyl halides, on a 4-substituted-3(2H)pyridazinone derivative of the general Formula VII,

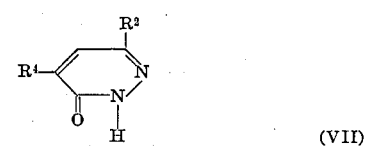

(VII)

wherein R² represents a member selected from the group consisting of halogen atoms and lower alkoxy radicals and R⁴ represents a member selected from the group consisting of amino radical and radicals capable of being converted to amino radical, followed by conversion of 4-substituent in the resulting 2-lower alkyl-4-substituted-3(2H)pyridazinone into 4-amino radical in the case when R⁴ is not amino radical in the above definition.

And the novel 4-amino 3(2H)pyridazinone derivative of the general Formula VIII,

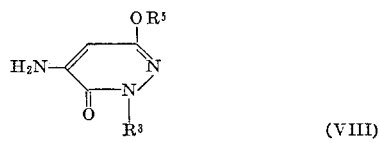

(VIII)

wherein each of R³ and R⁵ represents a lower alkyl radical respectively, can readily be produced by the reaction of a novel 2-lower alkyl-4-amino-6-halogeno-3(2H)pyridazinone derivative of the general Formula IX,

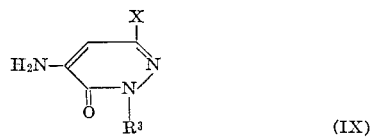

(IX)

wherein R³ represents a lower alkyl radical and X represents a halogen atom, with an alcohol of the general Formula X,

R⁵OH    (X)

wherein R⁵ represents a lower alkyl radical.

While these 4-amino-3(2H)pyridazinone derivatives can be advantageously obtained by the above mentioned processes, they may be produced by any of other processes.

In accordance with the process of the present invention, the first step in producing the compounds of the present invention usually involves the reaction of a 4-amino-3(2H)pyridazinone derivatives with a p-acylaminobenzenesulfonyl halide.

Reaction conditions to be employed are substantially similar to those which are conventionally employed for the production known sulfanilylamide compounds, e.g. sulfanilylaminodiazine, sulfanilylaminoisoxazole. In the most preferred embodiment, both of the above indicated reactants in approximately equimolar ratio are reacted at a temperature of from room temperature, i.e. 15° C. to 100° C., more preferably from 25° C. to 60° C., in the presence or absence of a solvent. The reaction which takes place herein is shown by the following equation,

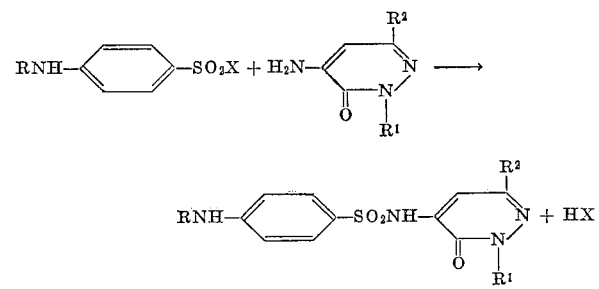

wherein R¹ represents a member selected from the group consisting of hydrogen atom and lower alkyl radicals, R² represents a member selected from the group consisting of halogen atoms and lower alkoxy radicals, X represents a halogen atom and R represents an acyl radical. As apparent from the equation, hydrogen halide is by-produced during the reaction, and therefore, it is particularly recommended to carry out the reaction in the presence of a hydrogen halide-acceptor, such as pyridine, alkali carbonate, alkali bicarbonate, etc. Suitable solvents, if used for the instant reaction, include water, methanol, ethanol, propanol, etc. Pyridine is particularly suitable because it takes a part as solvent and hydrogen halide-acceptor. Thus formed 4-(p-acylaminobenzenesulfonylamino)-3(2H)pyridazinone derivative of the general Formula III is then subjected to hydrolysis.

For example, it is heated together with an aqueous or alcoholic solution of a dilute acid or a dilute alkali solution (e.g. 1% to 40% solution) for a short period of time (e.g. from 10 minutes to 5 hours), thereby to give the corresponding 4-sulfanilylamino-3(2H)pyridazinone derivatives of the general Formula I as the hydrolysis product. The hydrolysis reaction can be advantageously carried out at a temperature of from 90° C. to 100° C. for a period of from 0.5 to 1.5 hours.

The acyl radical which is attached to protect the p-amino portion of the said acylaminobenzenesulfonyl halide may be formyl, acetyl, propionyl, butyryl, ethoxycarbonyl, benzoyl, etc. The halogen atom which constitutes the sulfonyl halide portion may be chlorine or bromine.

Typical examples of R¹ in the general Formulae I, II and III, include hydrogen atom, methyl, ehtyl, n-propyl, isopropyl, butyl (including isometric structures) radicals and those of R² include chlorine and bromine atoms and methoxy, ethoxy, n-propoxy, isopropoxy, butoxy (including isomeric structures) radicals.

Thus obtained 4-sulfanilylamino-3(2H)pyridazinone derivatives are novel compounds, and they are colorless crystalline substances, and soluble in dilute acid and alkali aqueous solutions, and difficultly soluble in benzene, chloroform and ethyl ether. They are easily soluble in hot alcohol and recrystallizable from ethanol or methanol.

As to the process for producing 4-amino-3(2H)pyridazinone derivatives of the general Formula II, which is the intermediate compounds of the present invention further mentioned as follows.

In the process for producing 4-amino-3(2H)pyridazinone derivatives of the general Formula VI,

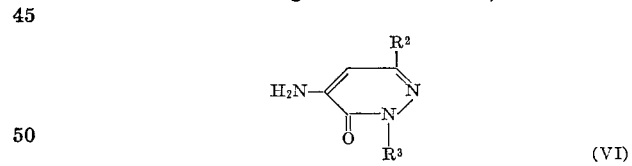

(VI)

wherein R² and R⁴ have the same meanings as identified above, from 4-substituted-3(2H)pyridazinone derivative of the general Formula VII,

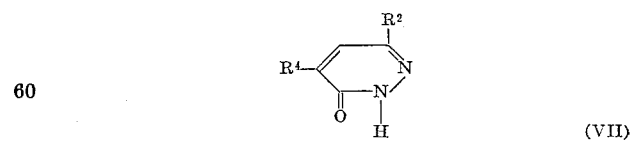

(VII)

wherein R² and R⁴ have the same meanings as identified above, by the action of an alkylating agent, as the alkylating agent, a conventional alkylating agent such as di-alkyl sulfates and alkyl halides can be utilized, and the reaction can be more accelerated in the presence of an acid-acceptor, such as alkali hydroxides and alkali carbonates. The reaction may be conducted in the presence or absence of a reaction medium, and as the reaction medium, inert medium such as water, alcohol, acetone and benzene can be utilized.

The reaction may be proceeded at a temperature below 200° C. and it can be proceeded at such a low temperature as room temperature in the case when an aqueous alkali hydroxide solution is utilized.

In the case when a 3(2H)pyridazinone derivative having a radical capable of being converted to amino radical in the 4-position is employed, amination after alkylation is necessary, and the amination may be conducted without isolating the alkylated product. The amination reaction may be conducted according to the conventional method depending upon the kinds of the radical capable of being converted to amino radical in the 4-position. For example, hydrolysis may be conducted in the case when the radical is acylamino radical and treatment with ammonia may be conducted in the case when the radical is halogen atom.

The compounds represented by the general Formula VI are novel compounds and they are colorless crystalline substance, and easily soluble in dilute acid soluble in water and alcohol, and diffcultly soluble in ether, and recrystallizable from ethyl acetate or acetone.

In the process for producing 4-amino-3(2H)pyridazine derivative of the general Formula VIII,

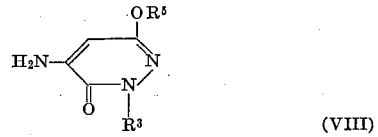

(VIII)

wherein $R^3$ and $R^5$ have the same meanings as identified above, from 2-lower alkyl-4-amino-6-halogeno-3-(2H)pyridazinone derivative of the general Formula IX,

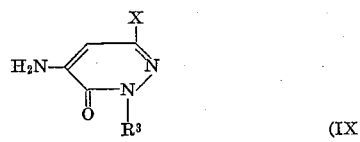

(IX)

wherein $R^3$ and X have the same meanings as identified above, by the reaction with an alcohol, the reaction is effected in the presence of an acid-acceptor. As the acid-acceptor, an inorganic or an organic basic substance such as alkali hydroxides, alkali carbonates, metal salts of an alcohol represented by the formula $R^5OH$ wherein $R^5$ is a lower alkyl and pyridine, may be utilized, in which sodium hydroxide and potassium hydroxide are most preferable.

Reaction medium may be utilized in order to proceed the reaction more smoothly, and as the reaction medium, inert medium such as benzene, toluene, petroleum benzine, and nitrobenzene may be utilized. Alcohols, which are the reactants, represented by the formula $R^5OH$ wherein $R^5$ is lower alkyl radical, may also be utilized. This reaction may be proceeded at a temperature below 300° C., and preferably at a temperature ranging from 100° C. to 200° C. in the case when an alkali hydroxide is utilized.

The sulfanilylaminopyridazinone compounds of the present invention are valuable as chemotherapeutic agents, being effective against various kinds of pathogenic micro-organisms in vitro. The present compounds show in vivo anti-bacterial activity stronger than the heretofore known long-acting sulfa drugs, and are less toxic. Table 1 shows the in vitro antimicrobial activity of the present compounds and the heretofore known sulfa drugs.

TABLE 1

| Strain tested | Minimum inhibitory concentration (μg./cc.)—Compounds of the invention | | | | |
|---|---|---|---|---|---|
| | Example 1 | Example 2 | Example 3 | SDM | SMP |
| Staphylococcus aureus 209p | 6.25 | 6.25 | 6.25 | 6.25 | 12.5 |
| Streptococcus, group A, type I | 12.5 | 12.5 | 12.5 | 25.0 | 25.0 |
| Diplococcus penumoniae, type I | 12.5 | 12.5 | 6.25 | 12.5 | 12.5 |
| Escherichia coli O-111 | 6.25 | 1.56 | 25.0 | 50.0 | 200 |
| Escherichia coli H-12 | 1.56 | 0.39 | 3.13 | 6.25 | 1.56 |
| Salmonella typhi 58 | 50.0 | 25.0 | 100 | 50.0 | 25.0 |
| Salmonella paratyphi 1015 | 3.13 | 3.13 | 3.13 | 1.56 | 3.13 |
| Salmonella schottmuelleri 8006 | 6.25 | 3.13 | 6.25 | 6.25 | 12.5 |
| Shigella flexneri 2a | 1.56 | 0.78 | 3.13 | 3.13 | 3.13 |
| Proteus vulgaris K-S | 0.20 | 0.20 | 0.20 | 0.78 | 0.39 |
| Klebsiella penumoniae 602 | 50.0 | 12.5 | 100 | 100 | 100 |
| BCG | 25.0 | 6.25 | 12.5 | 100 | 200 |

Table 2 shows the comparative data of curative effectiveness against streptococcus group A type I infection in mice of the compounds of the present invention and the heretofore known sulfa drugs. The treatment is by the oral administration once a day for five consecutive days.

TABLE 2.—Streptococcus, group A, type I

| | Mg./kg./day | Survivors/ numbers of tested animals | Survival Percent after 14 days |
|---|---|---|---|
| Control | 0 | 0/50 | 0 |
| Compound of the invention: | | | |
| Example 1 | 2.5 | 7/20 | 35 |
| | 5.0 | 18/20 | 90 |
| | 10.0 | 24/30 | 80 |
| | 50.0 | 10/10 | 100 |
| Example 2 | 2.5 | 0/10 | 0 |
| | 5.0 | 1/10 | 10 |
| | 10.0 | 5/15 | 33.3 |
| | 100.0 | 9/10 | 90 |
| Example 3 | 2.5 | 2/10 | 20 |
| | 5.0 | 5/10 | 50 |
| | 10.0 | 11/15 | 73.3 |
| | 100.0 | 10/10 | 100 |
| SDM | 10.0 | 13/50 | 26 |
| | 50.0 | 14/20 | 70 |
| | 100.0 | 14/20 | 70 |
| SMP | 5.0 | 17/50 | 34 |
| | 10.0 | 28/40 | 70 |
| | 50.0 | 14/20 | 70 |
| | 100.0 | 24/30 | 80 |
| SIM | 50.0 | 6/20 | 30 |
| | 100.0 | 4/10 | 40 |
| | 250.0 | 15/20 | 75 |
| SP | 50.0 | 5/20 | 25 |
| | 100.0 | 10/20 | 50 |
| | 500.0 | 17/20 | 85 |
| SI | 50.0 | 3/10 | 30 |
| | 100.0 | 19/40 | 47.5 |
| | 500.0 | 32/50 | 64 |

In the above-indicated tables, the abbreviation of the samples are as follows:

SDM: Sulfadimethoxine — 2,6 - dimethoxy-4-sulfanilyl-aminopyrimidine.

SMP: Sulfamethoxypyridazine — 3 - methoxy - 6 - sulfanilyl-aminopyridazine.

SIM: Sulfamethoxazole — 5 - methyl-3-sulfanilylami-noisoxazole.

SI: Sulfisoxazole — 3,4 - dimethyl-5-sulfanilyl-aminoisoxazole.

SP: Sulfaphenazole — 1 - phenyl-5-sulfanilylami-nopyrazole.

In order that those skilled in the art may better understand the invention, the following examples are given which are illustrative of the invention and are not intended for purposes of limitation.

*Example 1.—2-methyl-4-sulfanilylamino-6-methoxy-3-(2H)pyridazinone*

2 - methyl-4-amino-6-methoxy-3(2H)pyridazinone (3.7 grams) is suspended in 40 ml. of dry pyridine and 6.2 grams of p-acetylaminobenzenesulfonyl chloride is added portionwise thereto below 10° C. with stirring. After completion of the addition, the resulting solution is allowed to stand at room temperature overnight. The reaction mixture is poured into 2 times amount by volume of ice water, 12 ml. of 2 N sodium hydroxide solution is added thereto, and the solvent is removed in vacuo to form pale brown precipitate, which is collected by filtration and washed with water and dried. Thus, 7.2 grams (yield 86%) of 2-methyl-4-(p-acetylaminobenzenesulfonylamino)-6-methoxy-3(2H)pyridazinone, M.P. 234–236° C. is obtained. Recrystallization from methanol affords colorless prisms, M.P. 242–243° C.

Elementary analysis for $C_{14}H_{16}SO_5N_4$ is as follows—

Calcd.: C 47.73, H 4.58, N 15.90%.
Found: C 47.86, H 4.67, N 15.41%.

To 4.7 grams of the crude 2-methyl-4-(p-acetylaminobenzenesulfonylamino) - 6 - methoxy-3(2H)pyridazinone mentioned above, 30 ml. of 10% aqueous sodium hydroxide solution is added, and the resulting mixture is boiled under reflux for 45 minutes. After cooling, the mixture is acidified with acetic acid to form precipitate, which is collected by filtration and recrystallized from methanol along with charcoal treatment to yield 3.2 grams (yield 75%) of 2-methyl-4-sulfanilylamino-6-methoxy-3(2H)pyridazinone, colorless prisms, M.P. 215° C.

Elementary analysis for $C_{12}H_{14}SO_4N_4$ is as follows—

Calcd.: C 46.45, H 4.55, N 18.06%.
Found: C 46.55, H 4.55, N 18.14%.

*Example 2.—4-sulfanilylamino-6-methoxy-3(2H)pyridazinone*

4-amino-6-methoxy-3(2H)pyridazinone (6 grams) is suspended in 60 ml. of dry pyridine and 20.8 grams of p-acetylaminobenzenesulfonyl chloride is added portionwise thereto and reacted as in the Example 1. The reaction mixture is poured into 2 times amount by volume of ice water, 47 ml. of 2 N sodium hydroxide solution is added thereto, and the pyridine is removed in vacuo. To the resulting residue, 100 ml. of 10% aqueous sodium hydroxide solution is added, and the resulting mixture is boiled under reflux for 1 hour, added with charcoal and filtered. The filtrate is acidified with acetic acid to form precipitate, which is collected by filtration, and dried. Recrystallized from methanol, 5.7 grams (yield 45%) of 4-sulfanilylamino-6-methoxy-3(2H)pyridazinone, colorless needles, M.P. 249–250° C. is obtained.

Elementary analysis for $C_{11}H_{12}SO_4N_4$ is as follows—

Calcd.: C 44.60, H 4.08, N 18.91%.
Found: C 44.83, H 4.38, N 18.88%.

*Example 3.—2-methyl-4-sulfanilylamino-6-chloro-3(2H)pyridazinone*

2-methyl-4-amino - 6 - chloro - 3(2H)pyridazinone (10 grams) is suspended in 60 ml. of dry pyridine and 6.2 grams of p-acetylaminobenzenesulfonyl chloride is added portionwise thereto below 10° C. with stirring. After completion of the addition, the resulting solution is allowed to stand at room temperature overnight. The reaction mixture is poured into 2 times amount by volume of ice water, 31 ml. of 2 N sodium hydroxide solution is added, and pyridine is removed in vacuo. To the resulting residue, 100 ml. of 10% aqueous sodium hydroxide solution is added and the resulting mixture is boiled under reflux for 45 minutes, then acidified with acetic acid to form precipitate, which is collected by filtration to yield 11 grams of brown solid, M.P. 168–176° C. Recrystallization from methanol along with charcoal treatment affords 7 grams of 2-methy-4-sulfanilylamino - 6 - chloro-3(2H)pyridazinone, colorless prisms, M.P. 185–186° C.

Elementary analysis for $C_{11}H_{11}SO_3N_4Cl$ is as follows—

Calcd.: C 41.98, H 3.52, N 17.80%.
Found: C 42.20, H 3.48, N 17.62%.

*Example 4.—2-methyl-4-amino-6-methoxy-3(2H)pyridazinone*

4-acetamido - 6 - methoxy - 3(2H)pyridazinone (14 grams) is dissolved in 46 ml. of 2 N sodium hydroxide solution and 11.5 grams of dimethyl sulfate is added dropwise thereto under cooling with stirring. After stirring of 2 hours, precipitate formed is collected by filtration. Thus, 13.2 grams (yield 88%) of 2-methyl-4-acetamido - 6 - methoxy-3(2H)pyridazinone, solid, M.P. 201–204° C. is obtained. Recrystallization from ethanol affords 12.4 grams (yield 84%) of colorless plates, M.P. 204–205° C.

Elementary analysis for $C_8H_{11}O_3N_3$ is as follows—

Calcd.: C 48.72, H 5.62, N 21.31%.
Found: C 49.08, H 5.75, N 21.11%.

Then, 12 grams of thus obtained 2-methyl-4-acetamido-6-methoxy-3(2H)pyridazinone is added with 100 ml. of 2 N hydrochloric acid and the resulting mixture is boiled under reflux for 1 hour. After cooling, the mixture is made alkaline with sodium carbonate to form precipitate, which is collected by filtration, washed and dried. Thus, 7.7 grams (yield 82%) of 2 - methyl - 4 - amino-6-methoxy-3(2H)pyridazinone, M.P. 149–156° C. is obtained. Recrystallization from ethyl acetate affords colorless prisms, M.P. 157–158° C.

Elementary analysis for $C_6H_9O_2N_3$ is as follows—

Calcd.: C 46.44, H 5.85, N 27.08%.
Found: C 46.59, H 6.08, N 26.62%.

*Example 5.—2-methyl-4-amino-6-chloro-3(2H)pyridazinone*

4 - acetamido - 6 - chloro - 3(2H)pyridazinone (1.5 grams) is dissolved in 12 ml. of 1 N sodium hydroxide solution and 1.2 grams of dimethyl sulfate is added dropwise thereto under cooling with stirring.

Adding sodium hydroxide at intervals thereby keeping the pH value larger than 7, the reaction mixture is stirred for 2 hours to form precipitate, which is collected by filtration. Thus, 1.3 grams (yield 81%) of 2-methyl-4 - acetamido - 6 - chloro-3(2H)pyridazinone, M.P. 208–209° C. is obtained.

Recrystallization from ethanol affords 1.1 grams of colorless leaflets.

Elementary analysis for $C_7H_8O_2N_3Cl$ is as follows—

Calcd.: C 41.69, H 4.00, N 20.84%.
Found: C 41.87, H 4.19, N 20.55%.

Then, 6 grams of thus obtained 2-methyl-4-acetamido-6-chloro-3(2H)pyridazinone is added with 60 ml. of 2 N hydrochloric acid and the resulting mixture is boiled under reflux for 1 hour. After cooling, the mixture is made alkaline with sodium carbonate to form precipitate, which is collected by filtration, washed and dried. Thus, 4.3 grams (yield 91.5%) of 2-methyl-4-amino-6-chloro-3(2H)pyridazinone, crystals, M.P. 146–147.5° C. is obtained.

Recrystallization from ethyl acetate affords colorless needles, M.P. 148–148.5° C.

Elementary analysis for $C_5H_6ON_3Cl$ is as follows—

Calcd.: C 37.61, H 3.79, N 26.32%.
Found: C 38.17, H 4.00, N 26.12%.

Example 6.—2-methyl-4-amino-6-chloro-3(2H) pyridazinone 4-amino-6-chloro-3(2H)pyridazinone(1.45 grams) is dissolved in 15 ml. of 1 N sodium hydroxide solution and 1.3 grams of dimethyl sulfate is added dropwise thereto under cooling with stirring. After stirring of 2 hours from completion of the dropping, precipitate formed is collected by filtration. Thus, 1.1 grams (yield 63%) of 2-methyl-4-amino-6-chloro-3(2H)pyridazinone M.P. 145° C., is obtained, which shows M.P. 146–147° C. after recrystallization from ethyl acetate, and shows no-depression of the melting point when mixed with the 2-methyl-4-amino-6-chloro-3(2H)pyridazinone specimen obtained in the Example 5.

Example 7.—2-methyl-4-amino-6-methoxy-3(2H) pyridazinone

A mixture of 150 grams of 2-methyl-4-amino-6-chloro-3(2H)pyridazinone, 1300 ml. of methanol and 121.5 grams of potassium hydroxide (having 86% purity) is heated in an autoclave up to 130° C. for 10 hours. After cooling, the methanol is removed by distillation from the reaction mixture, the resulting residue is added with water, and the resulting water insoluble 2-methyl-4-amino-6-methoxy-3(2H)pyridazinone is collected by filtration and washed with water and dried. Thus, 123.3 grams (yield 85%) of 2-methyl-4-amino-6-methoxy-3(2H)pyridazinone, M.P. 160° C., is obtained. Recrystallization from methanol affords colorless prisms, M.P. 160° C.

Elementary analysis for $C_6H_9O_2N_3$ is as follows—

Calcd.: C 46.44, H 5.85, N 27.08%.
Found: C 46.59, H 6.08, N 26.62%.

Example 8.—2-methyl-4-amino-6-methoxy-3(2H) pyridazinone

A mixture of 3.2 grams of 2-methyl-4-amino-6-chloro-3(2H)pyridazinone and 40 ml. (2 times amount of theory) of 1 N sodium methylate methanol solution is heated in a sealed glass tube up to 150° C. for 2 hours. The after treatment conducted as in Example 7 affords 2.5 grams (yield 75%) of 2-methyl-4-amino-6-methoxy-3(2H)pyridazinone.

What we claim is:

1. A 4-sulfanilylamino-3(2H)pyridazinone derivative of the formula,

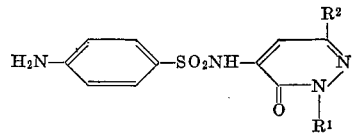

wherein $R^1$ represents a member selected from the group consisting of hydrogen atom and lower alkyl radicals and $R^2$ represents a member selected from the group consisting of halogen atoms and lower alkoxy radicals.

2. 2-methyl-4-sulfanilylamino-6-methoxy-3(2H)pyridazinone.

3. 4-sulfanilylamino-6-methoxy-3(2H)pyridazinone.

4. 2-methyl-4-sulfanilylamino-6-chloro-3(2H)pyridazinone.

References Cited by the Examiner

UNITED STATES PATENTS

| | | | |
|---|---|---|---|
| 2,712,012 | 6/1955 | Clark | 260—239.7 |
| 2,891,953 | 6/1959 | Clark et al. | 260—250 |

FOREIGN PATENTS

| | | |
|---|---|---|
| 600,532 | 4/1948 | Great Britain. |

OTHER REFERENCES

Nakagome et al.: J. Pharm. Soc., Japan, vol. 82, pp. 1103 to 1109 (1962).

Chemical Abstracts, vol. 52, col. 10,782 (1958). Abstract of Japanese Patent 7039.

JOHN D. RANDOLPH, *Primary Examiner.*